United States Patent [19]

Ching

[11] 4,260,732

[45] Apr. 7, 1981

[54] UV STABILIZED POLYCARBONATE RESINS

[75] Inventor: Ta-Yen Ching, Schenectady, N.Y.

[73] Assignee: General Electric Company, Schenectady, N.Y.

[21] Appl. No.: 123,667

[22] Filed: Feb. 22, 1980

[51] Int. Cl.$^3$ .............................................. C08G 63/64
[52] U.S. Cl. .................................. 528/192; 528/191; 528/193; 528/196; 528/202; 528/204; 528/370; 528/372
[58] Field of Search ............... 528/196, 202, 204, 193, 528/192, 370, 372, 191

[56] References Cited

U.S. PATENT DOCUMENTS

| | | | |
|---|---|---|---|
| 3,294,746 | 12/1966 | Farnham | 528/196 |
| 4,066,611 | 1/1978 | Axelrod | 528/196 |
| 4,105,629 | 8/1978 | Minagawa et al. | 528/196 |
| 4,139,687 | 2/1979 | Sannes | 528/196 |

*Primary Examiner*—Lester L. Lee
*Attorney, Agent, or Firm*—Joseph T. Cohen; James C. Davis, Jr.

[57] ABSTRACT

UV stabilizing units are incorporated in a polycarbonate molecule to impart UV stability to the polycarbonate.

7 Claims, No Drawings

UV STABILIZED POLYCARBONATE RESINS

This invention is concerned with polycarbonate resins containing interpolymerized UV stabilizing compounents in the polymer chain. More particularly, the invention is concerned with a polycarbonate resin having good stability to UV light wherein the polycarbonate resin comprises units of the formula

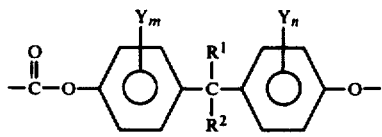

I.

and units of the formula

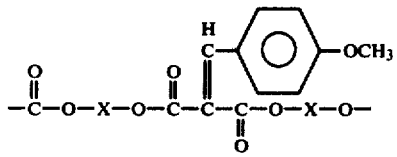

II.

where the Y's are independently selected from the class consisting of hydrogen, alkyl groups containing from 1 to 3 carbon atoms, (e.g., methyl, ethyl, propyl, etc.) and halogen, (e.g., chlorine, bromine, fluorine, etc.), $R^1$ and $R^2$ are independently selected from the class consisting of hydrogen, alkyl radicals of from 1 to 3 carbon atoms the same as Y, and the phenyl radical, X is a divalent saturated $C_2$-$C_{10}$ alkylene radical, and m and n are integers of from 1 to 2, inclusive, where the molar concentration of the units of formula II ranges from 0.1 to 25 mol percent based on the total molar concentration of the units of formulas I and II.

Polycarbonate resins consisting essentially of units of formula I have reduced photostability in the presence of UV light. Various UV stabilizers have been incorporated in the polycarbonate resin by mechanical or blending means. Although some success has been experienced by incorporating such UV stabilizers in this manner, such methods for stabilizing the polycarbonate resins are subject to a number of disadvantages. In the first place, it is often difficult to homogeneously distribute the UV stabilizer in the polycarbonate resin because of incompatibility problems. Additionally, even after incorporation, at elevated temperatures, many of the UV stabilizers tend to evaporate so that the protection afforded by the UV stabilizers is often reduced. Moreover, the amount of UV stabilizer which is to be incorporated in the polycarbonate resin often is limited because of the aforementioned difficulty of incompatibility, thus subjecting the polycarbonate resin to limited protection under severe illumination conditions.

I have now found that I can copolymerize a certain class of compounds at the same time that the polycarbonate resin is made so as to incorporate a UV stabilizer as a portion of the polycarbonate resin molecule. More particularly, I have found that polycarbonate resins containing units of formulas I and II in the proportion previously recited can be obtained by subjecting a mixture of a bisphenol of the general formula

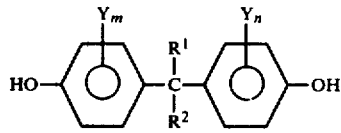

III.

with a bis orthoformate of the formula

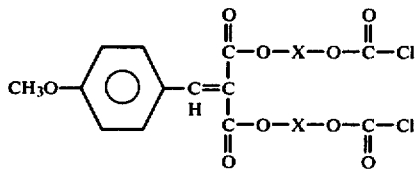

IV.

to phosgenating conditions to form the

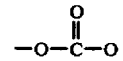

linkage in the polymer chain, where X, $R^1$, $R^2$, Y, m and n have the meanings given above. This interaction is carried out under usual phosgenating conditions using a carbonate precursor by subjecting the mixture of compositions of formulas III and IV to e.g., phosgene (carbonyl chloride), carbonate esters (e.g., diphenyl carbonate) in a solvent such as methylene chloride, 1,2-dichloroethane, etc., and in the further presence of an alkaline agent serving as a hydrochloride acceptor, such as a tertiary amine. More particular directions for making polycarbonate resins which can be employed in making the copolymers of the instant invention, may be found in U.S. Pat. Nos. 4,801,175, 2,946,766 and 2,999,835 which patents by reference are incorporated in the disclosures and teachings of the instant application.

The compounds of formula IV, and methods for making the same are more particularly disclosed and claimed in my copending application Ser. No. 123,668 allowed, filed concurrently herewith and assigned to the same assignee as the present invention. More particularly, a compound corresponding to the formula,

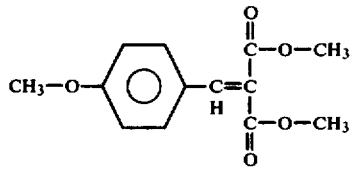

V.

is reacted with a dihydric compound of the formula,

VI. HO-X-OH where X has the meaning above, in the presence of sodium methoxide to give a composition of the formula,

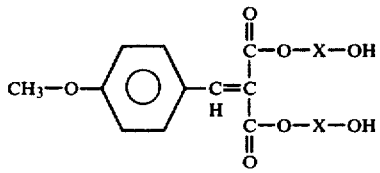

VII.

Treatment of the latter compound of formula VII with an excess of phosgene yields the desired orthochloroformate of formula IV. This compound of formula IV can then be interacted with a dihydric phenol of formula III as pointed out above, to form the compositions described and claimed in the instant application.

Among the groups which X may represent are, for instance, —CH$_2$CH$_2$—, —CH$_2$(CH$_2$)$_2$—CH$_2$—, —CH$_2$C(CH$_3$)$_2$—CH$_2$—, —CH$_2$(CH$_2$)$_4$—CH$_2$—, CH$_2$—(CH$_2$)$_8$—CH$_2$—, etc.

Among the bisphenols which can be used to make the aryl polycarbonates of the claimed invention and which come under formula III are the following
2,2-bis-(4-hydroxyphenyl)propane (Bisphenol-A),
2,4'-dihydroxydiphenylmethane,
bis-(2-hydroxyphenyl)methane,
bis-(4-hydroxyphenyl)-methane,
bis-(4-hydroxy-2,6-dimethyl-3-methoxyphenyl)-methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenylpropane, etc.

Additional dihydric phenols (or mixtures of these and other dihydric phenols are not precluded which may be employed within the scope of the dihydric compound of formula III to provide carbonate polymers) are disclosed in U.S. Pat. No. 2,999,835 of Eugene P. Goldberg assigned to the same assignee as the present invention. It is of course possible to employ two or more different dihydric phenols of other dihydric phenols in combination with a glycol, a hydroxyacid terminated polyester or a dibasic acid in the event that a carbonate copolymer of modified scope is desired.

Although the polymer formation may be conducted in the absence of a catalyst, one may if desired employ the usual ester exchange catalysts, such as, for example, metallic lithium, potassium, calcium, and magnesium. Additional catalysts and variations in the exchange methods are discussed in Groggins, "Unit Processes in Organic Syntheses", fourth edition, McGraw Hill Book Company, (1952) pages 616 to 620. The amount of catalyst used is usually small, ranging from 0.001 to 0.1%, based on the total molar concentration of the dihydric compound (or compounds) of formula III and bischloroformate of formula IV used.

Where a carbonyl halide such as phosgene is employed as the carbonate precursor, the method involves passing phosgene gas into a reaction mixture containing the two compounds of formulas III and IV in the presence of a catalyst, such as a tertiary amine, e.g., pyridine, dimethylaniline, quinoline, etc. The catalyst may be used undiluted or diluted with an inert organic solvent as, for example, methylene chloride, chlorobenzene, etc.

The temperature at which the carbonation reaction proceeds may vary from below 0° C. to above 100° C. The reaction proceeds satisfactorily at temperatures of from room temperature (about 25° C.) to 50° C. Where phosgene is employed, its addition may be used to control the reaction temperature. The amount of the precursor supplying the carbonate linkage required will generally depend upon the amount of the compositions of formulas III and IV. Generally speaking, less than one mol of, for instance, phosgene will react with 1 mol of the mixture of the two compounds of formulas III and IV to provide the desired polymer. The foregoing are herein referred to as stoichiometric or theoretical amounts. Other methods of making the polycarbonate resin are more particularly disclosed in U.S. Pat. No. 3,498,946 issued Mar. 3, 1970 and assigned to the same assignee as the present invention. By reference the disclosures and teachings of this patent are incorporated in the instant application.

The molar concentration of the unit of formula II is advantageously at a maximum of 25 mol percent of the total molar concentration of the two units of formulas I and II. Where the polycarbonate contains 25 mol percent of the unit of formula II, it is found that such polycarbonates, particularly those made from Bisphenol-A tend to be somewhat brittle, as contrasted to the properties of the usual polycarbonate resin which have good impact resistance and flexibility. However, the preparation of copolymers of the units of formula I and II which tend to be brittle are still within the scope of this invention, because such polymers containing a high molar concentration of the units of formula II can be blended with regular polycarbonate resins to impart to the latter a UV stability which was not present before the blending. Due to the commonality of the aromatic dihydric moiety in the copolymer and the usual homopolymeric polycarbonate, greater compatibility can be expected and more facile incorporation of the copolymer and larger amounts of the UV stabilizer in the homopolymer are achieved.

In order that those skilled in the art may better understand how the present invention may be practiced, the following examples are given by way of illustration and not by way of limitation. All parts are by weight, unless otherwise indicated. Any recitation of molar amounts is intended to be on a percentage bases, unless indicated that it is the actual molar amount used.

The following example illustrates the preparation of a typical dichloroorthoformate coming within general formula IV.

EXAMPLE 1

191 grams (1.45 mols) of dimethyl malonate, 198 grams (1.45 mols) para-methoxybenzaldehyde, 30 grams ammonium acetate, 85 grams acetic acid and 500 ml benzene were refluxed with a Dean Stark trap until 1.45 mols of water was removed. The solution was cooled, washed with water and dried. The volatile, unreacted starting materials were removed by vacuum distillation and the residue recrystallized from methanol/H$_2$O to give a compound having the formula,

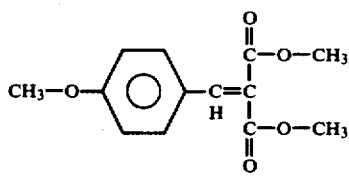

VIII.

The identity of this compound was established by NMR analysis. 320 grams (3.0 mols) neopentyl glycol was added to a 500 ml, toluene solution containing 350 grams (1.4 mols) of the compound of formula VIII and 0.2 gram sodium methoxide. The ester exchange reaction was driven to completion by distilling off methanol. The solution thus obtained was washed with 5% HCl, then with 5% sodium bicarbonate and finally water, dried and recrystallized with toluene to give the compound

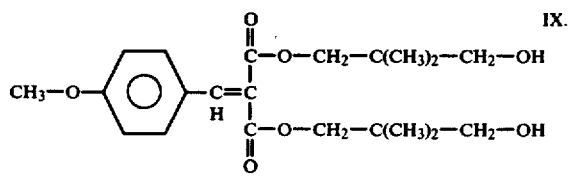

IX.

having the melting point of 111°-113° C. (yield about 93%). The identity of this material was established by NMR and also by UV analyses.

A three fold molar excess of phosgene was dissolved in a cold methylene chloride solution. One part of the composition of formula IX was slowly added and the solution was warmed to room temperature (about 27° C.) at the end of the addition. Excess phosgene was driven off by purging with nitrogen. The resulting bis-chloroformate dissolved in methylene chloride solution had the formula,

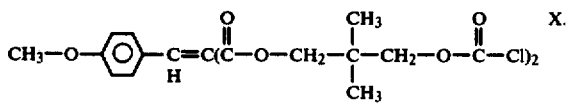

X.

EXAMPLE 2

This example illustrates the copolymerization of the compound of formula X with Bisphenol-A to make a polycarbonate copolymer containing the UV stabilizer interpolymerized with the reactants required to make the usual polycarbonate resin. More particularly, to 10.26 grams (0.045 mol) Bisphenol-A, was added 40 cc methylene chloride; 1.97 grams (0.005 mol) of the compound of formula X in the form of the above methylene chloride solution of Example 1 was introduced dropwise with vigorous stirring. After the completion of the addition, 165 mg, (3.5 mol percent) phenol as an end-capping ingredient for the polymer was added together with 0.1% by weight, of the reactants of triethylamine and 30 cc water. Phosgene and a 50 percent aqueous NaOH solution (equivalent to the molar concentration of the hydroxy groups on the Bisphenol-A) were added to the mixture with stirring over a period of about 30 minutes at a temperature of about 30° C. to yield 13 grams of a copolymer which contained 10 mol percent of units of the formula,

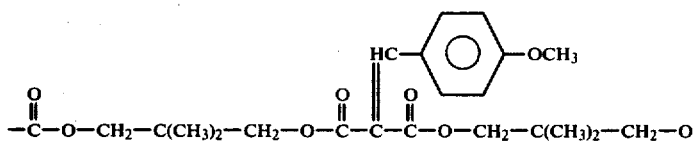

XI.

and 90 mol percent of units of the formula,

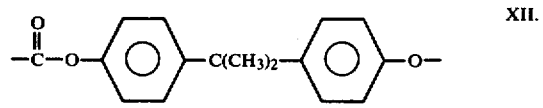

XII.

Employing a test for UV stability, pursuant to ASTM-1925, it was found that the UV stability of the polycarbonate containing 10 mol percent of the interpolymerized UV stabilizer was considerably more resistant to accelerated light aging than the homopolymer without the intercondensed UV stabilizer units as shown in the attached Table I. Also it will be noted from this table that the intrinsic viscosity of the copolymer was substantially unchanged from the homopolymer without the UV stabilizer units, while the Tg was somewhat lower for the copolymer as contrasted to the homopolymer.

TABLE I

| Test No. | Molar Ratio of Units | | *Intrinsic Viscosity | Tg °C. | ΔYI, Sumlamp | | |
|---|---|---|---|---|---|---|---|
| | Formula XII | Formula XI | | | 168 hrs. | 336 hrs. | 504 hrs. |
| 1 | 100 | 0 | 0.52 | 149 | 4.2 | 8.3 | 9.5 |
| 2 | 90 | 10 | 0.47 | 121 | −0.7 | 0.3 | 0.6 |

*dl/g in CHCl₃ both having 3.5 mol percent end-capping of phenol.

EXAMPLE 3

When a copolymer was made similarly as in Example 2 comprising 25 mol percent of units of formula XI and 75 mol percent of units of formula X, a copolymer was obtained whose intrinsic viscosity was 0.23 and its Tg was 106° C. This polymer can be incorporated (in amounts ranging, by weight, from 0.5 to 25 parts of the stabilized resin per 100 parts of the unstabilized resin) in a homopolymeric or other polycarbonate resin free of UV stabilizer to be a source of UV stabilizer, thereby providing a more compatible way of introducing the UV-stabilizer and still be capable of exerting a UV stabilizing effect on the unstabilized polymer.

EXAMPLE 4

This example illustrates the ability to form master batches of the polycarbonate containing interpolymerized UV stabilizing units and then applying a thin layer of such mixture to a substrate to provide protection against ultraviolet light. More particularly, 0.2 gram of the copolymer described in Example 3 and 0.8 gram of 100% polycarbonate (Example 2) resin (homopolymer from Bisphenol-A) of the type described in Test No. 1 of Table I were dissolved in 9 grams of methylene chloride. A solution of similar concentration of the 100% of the homopolymeric carbonate was also formed in methylene chloride. The solutions thus obtained were cast in the form of a 4 mil thick film on a substrate of quartz and the solvent was removed by vacuum. Sunlamp aging was carried out on these coated substrates pursuant to ASTM-1925 with the results shown in the following Table II.

TABLE II

| Test No. | Resin Coating | ΔYI 1 Week | Sunlamp 2 Weeks |
|---|---|---|---|
| A | 100% Polycarbonate resin | 4.2 | 8.3 |
| B | 1 Part Copolymer Example 3 4 Parts 100% Polycarbonate Resin | 2.1 | 3.2 |

EXAMPLE 5

When other bischloroformates of formula IV (based on changing the glycol to make the latter compounds) are interpolymerized with other dihydric phenols of formula III (or Bisphenol-A) more particularly described in the instant application, it will be found that these copolymers have greater stability to UV light when tested in the manner described above than when only the homopolymeric polycarbonate resin is tested for UV stability.

It will of course be understood that other dihydric aromatic phenols of formula III can be employed in place of the Bisphenol-A used in the previous example, and other bischloroformates of formula IV, (which can be prepared in the same manner as was used in Example 1), as well as variations in temperature, end-capping compounds and molar concentrations of reactants can be used, without departing from the scope of the invention.

Compositions of the instant invention can be used in many applications, particularly in those where resistance to UV light is an important consideration. Thus, the resinous copolymers can be used as glazing materials, protective films, etc. In addition, these compositions may be used in various molding applications, either by transfer, compression, injection, or other type of molding, to make the various products in addition to those mentioned above.

Compositions of the present invention have application in a wide variety of physical shapes and forms, including the use as films, molding compounds, coatings, etc. When used as films or when made into molded products, these polymers, including laminated products prepared therefrom, not only possess good physical properties at room temperature but they retain their strength and excellent response to workloading at elevated temperatures for long periods of time. Films formed from the polymeric compositions of this invention may be used in applications where films have been used previously. Thus, the compositions of the present invention can be used in automobile and aviation applications for decorative and protective purposes, in laminated structures where films of the present composition or where solutions of the claimed compositions of matter are applied to various heat-resistant or other type of materials such as asbestos, mica, glass fiber and the like and superposing the sheets one upon the other and thereafter subjecting them to elevated temperatures and pressures to effect flow and cure of the resinous binder to yield cohesive laminated structures. Films made from these compositions of matter can also serve in printed circuit applications.

Molding compositions and molded articles may be formed from the polymeric compositions in this invention by incorporating fillers such as asbestos, glass fibers, talc, quartz, powder wood flour, finely divided carbon, silica, into such compositions prior to molding. Shaped articles are formed under heat, or under heat and pressure in accordance with practices well known in the art. Various heat-resistant pigments and dyes may be incorporated depending on the application intended.

The compositions herein defined may be suitably incorporated with other materials to modify the properties of the latter or in turn they may be modified by the incorporation of the materials, for example, they may be compounded with substances such as natural or synthetic rubbers, synthetic resins such as phenol-aldehyde resins, alkyd resins, etc.; cellulosic materials such as organic esters of cellulose, such as cellulose acetate, cellulose ethers, etc.

What I claim as new and desire to secure by Letters Patent of the United States is:

1. An aryl polycarbonate resin having good stability to UV light where the said resin comprises aryl carbonate units of the formula,

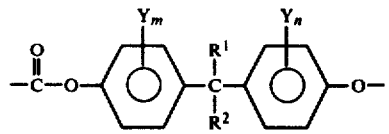

and formate units of the formula,

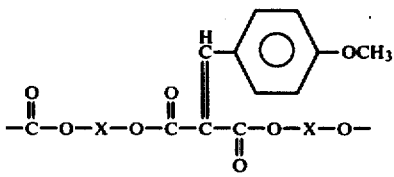

where the Y's are independently selected from the class consisting of hydrogen, alkyl groups containing from 1 to 3 carbon atoms, $R^1$ and $R^2$ are independently selected from the class consisting of hydrogen, alkyl radicals of from 1 to 3 carbon atoms, and phenyl radical, X is a divalent saturated $C_2$-$C_{10}$ alkylene radical, and m and n are integers of from 1 to 2, inclusive, where the molar concentration of the formate unit ranges from 0.1 to 25 mol percent, based on the total molar concentration of the two aforesaid units.

2. The composition as in claim 1, wherein X is —CH$_2$—CH$_2$—.

3. The composition as in claim 1, wherein X is —CH$_2$—C(CH$_3$)$_2$—CH$_2$—.

4. The composition as in claim 1, wherein X is —CH$_2$—(CH$_2$)$_2$—CH$_2$—.

5. The composition as in claim 1, where Y is hydrogen and $R^1$ and $R^2$ are methyl radicals.

6. The composition as in claim 1, wherein X is —CH$_2$—C(CH$_3$)$_2$—CH$_2$—.

7. The composition as in claim 1 where X is —CH$_2$CH$_2$—, Y is hydrogen and $R^1$ and $R^2$ are methyl.

* * * * *